July 15, 1930.  C. W. WEISS  1,770,502
UNIVERSAL JOINT
Filed April 16, 1929
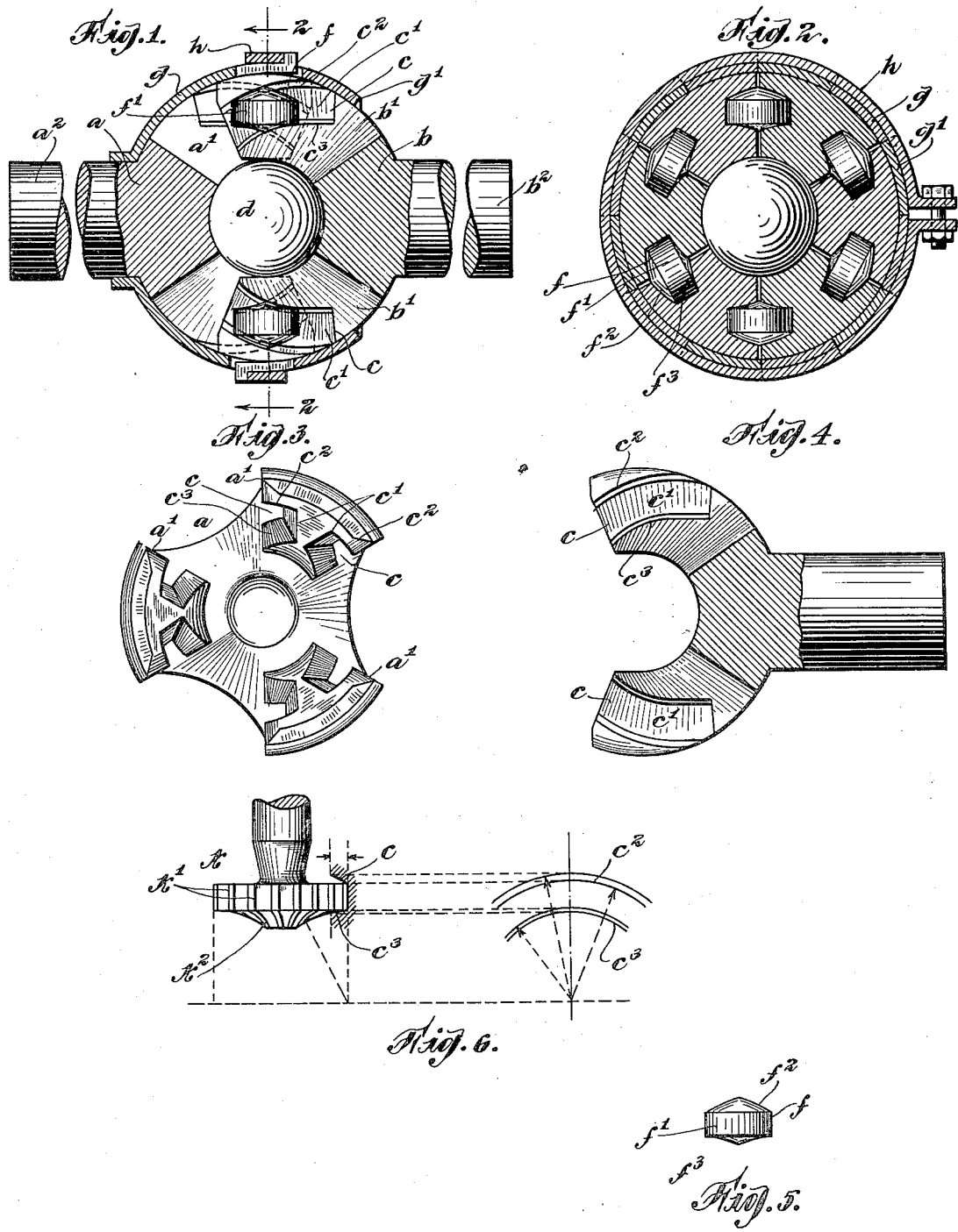
INVENTOR
Carl W. Weiss
BY
Redding, Greeley, O'Shea & Campbell
ATTORNEY Patented July 15, 1930

1,770,502

UNITED STATES PATENT OFFICE

CARL W. WEISS, OF BROOKLYN, NEW YORK

UNIVERSAL JOINT

Application filed April 16, 1929. Serial No. 355,531.

This invention relates to universal joints of the character of that shown in Letters Patent of the United States No. 1,522,351, dated January 6, 1925, in which the two members capable of relative angular displacement have co-acting portions with proximate faces formed with non-concentric grooves with their longitudinal axes intersecting at an angle and a relatively movable body received partly in each of such grooves and through which force is transmitted from one co-acting portion to the other, such relatively movable body lying always in a plane which bisects the angle of displacement of the two members, whereby there is no relative fluctuation of angular velocity of the driven member as compared with the driving member. In the construction shown in said patent each intersecting groove is semicircular in cross section to receive an intermediate or relatively movable body which is spherical. In the continued development of such universal joints it has been found that the machining of the grooves circular in cross section has been difficult and has added a substantal item to the cost of production. Such grooves must be cut with a spherical or ball-end cutter and as the diameter of such cutter must be slightly larger than the diameter of the spherical intermediate body and as such cutters wear down quite rapidly, the cutter must be renewed frequently so that the proper diameter of the groove may be maintained in mass production. Moreover, because such spherical body bears in its groove at a point, at least theoretically, it has been necessary to make all parts heavier than would be necessary if the intermediate, movable body had a line bearing rather than a point bearing. It has been the object of this invention, therefore, to overcome the difficulties referred to and to that end the bottom or working face of each groove is made flat, having substantial width, rather than curved, and the intermediate or relatively movable body is formed as a roller, having a line contact with the bottom or working face of the groove, the side walls of the groove and the ends of the roller being formed so that the roller is properly guided and lies always with its axis in a plane which bisects the angle of displacement of the two members of the joint.

The invention will be more fully described hereinafter with reference to the accompanying drawing in which it is illustrated and in which:

Figure 1 is a view in longitudinal section through a universal joint which embodies the invention, the intermediate, relatively movable bodies, the central, spherical supporting member, and the shafts being shown in elevation, the shafts being broken out to save space.

Figure 2 is a view in transverse sectional elevation of the joint shown in Figure 1.

Figure 3 is a view in end elevation of the driving member shown in Figures 1 and 2.

Figure 4 is a view in longitudinal sectional elevation of the driving member shown in Figure 3.

Figure 5 is a detail view in elevation of one of the intermediate or relatively movable rollers.

Figure 6 is a view illustrating the relation of a circular milling cutter to the groove cut by it, the shape of the groove being illustrated in projection at the right hand.

In the embodiment of the invention illustrated in the drawing a driving member $a$ of the joint is formed with three finger-like portions or projections $a^1$ with radial faces and designed to co-act with corresponding finger-like portions or projections $b^1$ of a driven member $b$. The members $a$ and $b$ are shown as formed integral with the shaft portions $a^2$ and $b^2$, respectively, and two members are shown as central upon a spherical bearing $d$. In the approximate face of each finger-like portion or projection $a^1$, $b^1$ of the two members $a$, $b$, there is formed a groove $c$, the bottom or working face $c^1$ of which is flat or substantially flat and of substantial width, in a plane radial to the axis of the joint member $a$ or $b$, as the case may be. Such a groove may be cut by a cylindrical cutter $k$, such as that illustrated in Figure 6, and in the operation of cutting with such a cutter the side walls $c^2$ and $c^3$ are formed as shown in the drawing. The two grooves of the two approximate faces of co-acting portions of the joint members are formed as described in said patent, so that their longitudinal axes, whether straight or curved, are non-concentric or are oppositely disposed with respect to each other so that they intersect, in all positions of angular displacement of the joint, in a plane which bisects the angle of displacement of the two members.

As in the construction shown in said patent, so in the present construction, force is not transmitted from one member of the joint to the other through contact of the proximate faces of the co-acting portions of the two members, but through an intermediate and relatively movable body which in the present case is formed as a roller $f$ having a cylindrical working surface $f^1$ which has a line contact with the bottom or working surface $c^1$ of each of the two grooves $c$ in which it is received. In order that this intermediate and relatively movable member may be guided in its movements and may lie with its axis always in a plane which bisects the angle of displacement of the two members of the joint and is radial to the center of the joint, its ends, as at $f^2$ and $f^3$, are formed to fit, with proper tolerance, the corresponding side walls $c^2$ and $c^3$ of the groove. It will be understood that in the milling with a cylindrical cutter of a curved groove such as that shown, with a flat working face parallel with the axis of the joint member, the two side walls of the groove have different forms, the outer wall being cut by the peripheral cutter teeth $k^1$ of the cutter and the inner wall by the curved teeth $k^2$ at the end of the cutter. The teeth $k^2$ must be formed on the radius of curvature of the groove in order that the roller, properly formed, shall bear properly in all positions against the inner wall on the same radius, without undue wear in operation. It is of great importance to successful operation that the roller shall, with proper tolerance, fit in the grooves in all positions without angular displacement of its axis, and for that reason the outer end of the roller must be slightly convex as shown to fit against the concaved outer wall of each groove and the inner end must be concaved on the radius of curvature of the groove so that it may fit against the inner wall of the groove.

The two members of the joint may be retained in operative relation by partly spherical shells $g$ and $g^1$ and a retaining link $h$, as shown in said patent.

The action of the universal joint as thus described is the same as that of the joint described in said patent and need not be further explained herein.

I claim as my invention:

1. A universal joint having two members capable of relative angular displacement and having co-acting portions with their proximate faces formed with non-concentric grooves with their longitudinal axes intersecting at an angle and a relatively movable body received partly in each of such grooves and through which force is transmitted from one co-acting portion to the other, each groove having a flat working face and each relatively movable body having a cylindrical working surface with line contact with the working face of the groove.

2. A universal joint having two members capable of relative angular displacement and having co-acting portions with their proximate faces formed with non-concentric grooves with their longitudinal axes intersecting at an angle and a relatively movable body received partly in each of such grooves and through which force is transmitted from one co-acting portion to the other, each groove having a flat working face and each relatively movable body having a cylindrical working surface with line contact with the working face of the groove and having its ends formed to conform to the side walls of the groove.

3. A universal joint having two members capable of relative angular displacement and having co-acting portions with their proximate faces formed with non-concentric grooves with their longitudinal axes intersecting at an angle and a relatively movable body received partly in each of such grooves and through which force is transmitted from one co-acting portion to the other, each groove being curved and having a flat working face with an outer wall concaved and an inner wall convexed on the radius of curvature of the groove and each relatively movable body having a cylindrical working surface and having its outer end convexed to fit the outer wall of the groove and its inner end concaved to fit the inner wall of the groove.

This specification signed this 9th day of April, A. D. 1929.

CARL W. WEISS.